Aug. 4, 1931.  H. E. SIPE  1,817,772
TUBE AND PIPE COUPLING
Filed Oct. 27, 1927    2 Sheets-Sheet 2
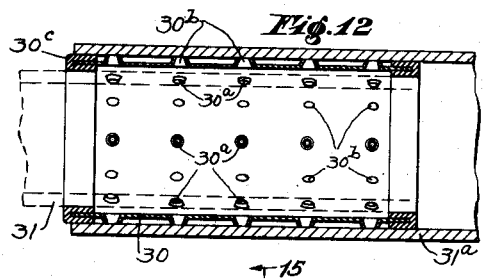
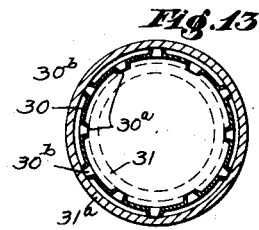
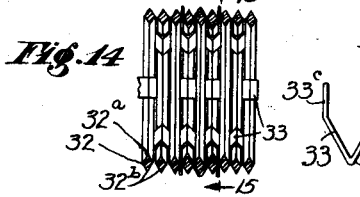
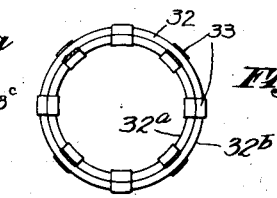
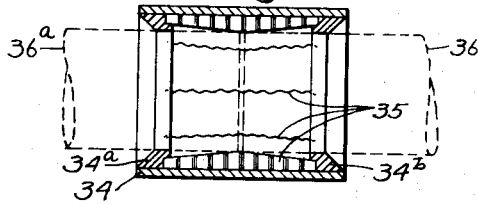
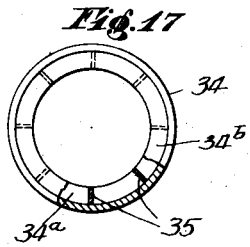
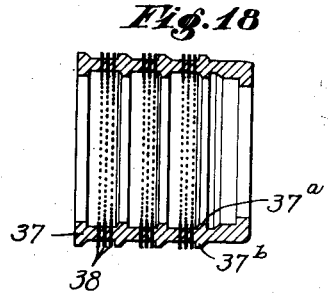
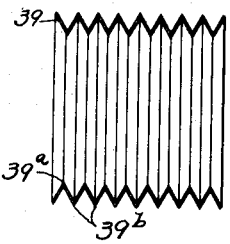
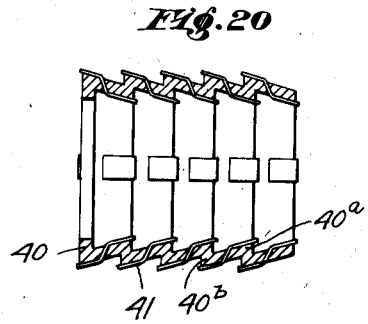
INVENTOR
Harry E. Sipe
BY
ATTORNEY Patented Aug. 4, 1931

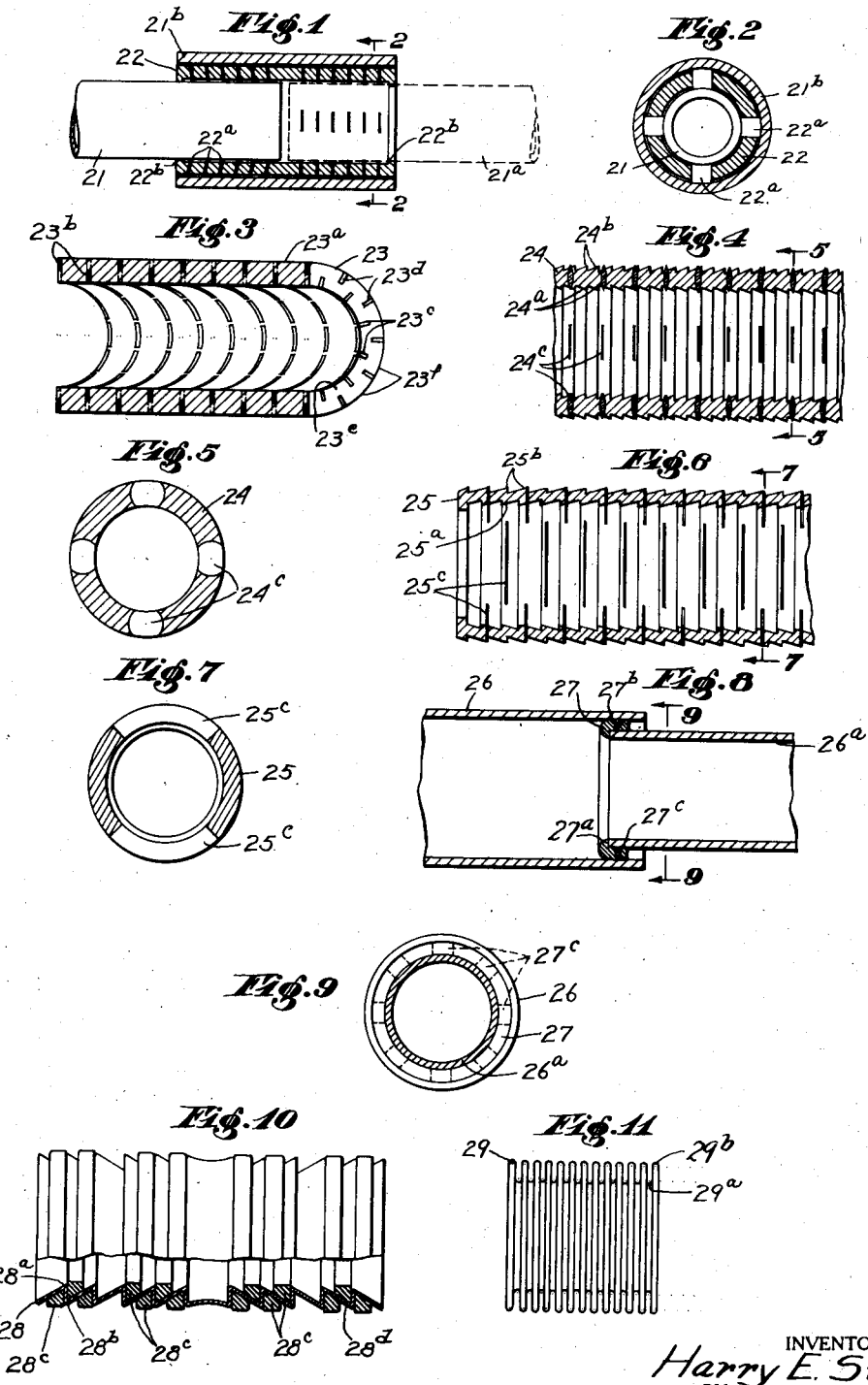

1,817,772

UNITED STATES PATENT OFFICE

HARRY E. SIPE, OF NEW YORK, N. Y.

TUBE AND PIPE COUPLING

Application filed October 27, 1927. Serial No. 229,024.

This invention relates to devices for coupling tubes, pipes and the like of any cross sectional form; and the object of the invention is to provide a device of this class adapted to slidably engage the adjacent ends of two pipes or tubes for coupling the same together and to provide a strong and durable connection therebetween; a further object being to provide a coupling device consisting of yieldable parts or bodies and involving metallic elements whereby when the separate parts of the pipe or tube are coupled together the electrical ground is continued through said coupling; a furher object being to provide a device including a resilient body or bodies forming an air-tight or liquid tight connection between the pipes or tubes coupled together thereby; and with these and other objects in view, the invention consists in a coupling of the class and for the purpose specified, which is simple in construction, efficient in use, and which is constructed as hereinafter described and claimed.

The invention is fully disclosed in the following specification, of which the accompanying drawings form a part, in which the separate parts of my improvement are designated by suitable reference characters in each of the views, and in which:—

Fig. 1 is a sectional view of one form of coupling which I employ, illustrating the method of its use.

Fig. 2 is a section on the line 2—2 of Fig. 1.

Fig. 3 is a sectional and perspective view of a modified form of coupling.

Fig. 4 is a view similar to Fig. 1 but showing another form of coupling.

Fig. 5 is a section on the line 5—5 of Fig. 4.

Fig. 6 is a view similar to Fig. 4 but showing a modification.

Fig. 7 is a section on the line 7—7 of Fig. 6.

Fig. 8 is a view similar to Fig. 1 but showing a modification.

Fig. 9 is a section on the line 9—9 of Fig. 8.

Fig. 10 is a side and sectional view of another form of coupling.

Fig. 11 is a view similar to Fig. 10, showing another modification.

Fig. 12 is a view similar to Fig. 1, showing a modification.

Fig. 13 is a cross section of the structure shown in Fig. 12.

Fig. 14 is a sectional view of another form of coupling.

Fig. 15 is a section on the line 15—15 of Fig. 14.

Fig. 15a is a detail view of a part of the construction shown in Figs. 14 and 15.

Fig. 16 is a view similar to Fig. 12, showing a modification.

Fig. 17 is an end and sectional view of the structure shown in Fig. 16.

Fig. 18 is a view similar to Fig. 14 showing a modification.

Fig. 19 is a view similar to Fig. 11, showing a modification; and,

Fig. 20 is a view similar to Fig. 14 but showing a further modification.

My invention relates to the coupling of pipes or tubes of any kind or class, and while circular coupling members are herein disclosed, it will be understood that my invention may be applied to pipes or tubes of any cross-sectional form, the coupling being constructed to suit the cross sectional form of the tubes employed. It will also be understood that the coupling may be apppplied to the tubes in any desired manner; that is to say, may be interposed between the walls of small and large tubes or mounted on tubes of like dimensions in which latter case, a coupling sleeve or tube may be employed. In the accompanying drawings, I have indicated the method of using a few of the couplings, and the other couplings may be used in a similar manner.

In Figs. 1 and 2 of the drawings, 21 and 21a represent the separate pipes or tubes to be coupled together and 21b a coupling sleeve, between which and the tubes 21—21a my improved coupling device 22 is disposed. The device 22 consists of an elongated tubular body of resilient or yieldable material in which is embedded a pluraplity of longitudinally and circumferentially spaced metallic plates or members 22a which project beyond the inner and outer faces of the resilient body to firmly engage the walls of the tubes 21, 21a and the sleeve 21b. It is also preferred that inwardly extending flanges 22b be employed at the opposite ends of the coupling 22 to engage the tubes 21—21a to form an air and water tight connection therebetween, said flanges being yieldable and placed under tension in the operation of inserting the tubes into the coupling device. In this operation, it will also be understood that the metallic plates or members 22a are forced into an inclined position as seen at the left of Fig. 1, the degree of inclination depending upon the relative outside diameter of the tubes as compared with the sleeve 21b. As seen at the right of Fig. 1, the members 22a are normally at right angles to the axis of the coupling 22. The plates 22a in addition to securely and firmly coupling the tubes 21 and 21a, also form a continuation of an electric ground through said tubes by transmission through the coupling 21b, even though the adjacent ends of said tubes are not in abutting relation, it being understood that the flexing of the members 22a in the direction indicated at the left of Fig. 1 of the drawings, will prevent the removal of the tube 21 and also the tube 21a when inserted.

The above detail description of the operation and use of the coupling and the metallic elements when employed, will apply to all of the other forms of construction shown, except where the coupling of the tubes is relied upon by resilient members or bodies or the compression or flexing of such bodies. Thereafter, the other forms of construction will be only structurally described.

In Fig. 3 of the drawings, I have shown a coupling body 23 consisting of a plurality of comparatively wide and resilient rings 23a between which are disposed comparatively thin metallic rings 23b, the latter being divided on their inner and outer peripherial edges by slots 23c and 23d to form spaced flexible members 23e and 23f on the inner and outer edges of said rings. These members may be in common alinement with the inner and outer faces of the rings 23a or project slightly therebeyond to permit of the flexing of the same in the coupling of the pipes or tubes therewith. The separate rings may be cemented or vulcanized together to form a unitary body as will be apparent.

In Figs. 4 and 5 of the drawings, I have shown a resilient coupling body 24 of tubular form, the inner and outer walls of which are irregular or tooth-like in cross sectional form as seen in Fig. 4 of the drawings, forming a multiplicity of projecting resilient members, 24a on the inner wall surface and 24b on the outer wall surface. In this construction, a plurality of longitudinally and circumferentially spaced metallic disks 24c are imbedded in the body 24, said disks projecting through the inner and outer surfaces of the body 24 for engagement with the tubes or pipes to be coupled together by the coupling 24, said disks being capable of flexing in the manner of the flexing of the members 22a.

In Figs. 6 and 7 of the drawings, I have shown a coupling body 25 substantially the same as that shown in Fig. 4 except that the tooth-like projections 25a on the inner wall and 25b on the outer wall are in a different relation, and of greater depth, to form in the complete coupling, a substantially continuous, thread-like arrangement of the wall of the coupling extending longitudinally thereof. In this construction, comparatively large arc-shaped metallic members 25c are imbedded in alternate relation longitudinally of the coupling and spaced circumferentially thereof. The members 25c project to the ends of the projections 25a and 25b so that when the members 25a and 25b are flexed and placed under operation, the members 25c are correspondingly flexed or inclined as in the construction shown in Fig. 1 of the drawings.

In Figs. 8 and 9 of the drawings, I have shown at 26 and 26a two pipes or tubes coupled together, the pipe 26 being of larger diameter than the pipe 26a and the coupling 27 is interposed between the outer surface of the pipe 26a and the inner surface of the pipe 26, the coupling being substantially L-shaped in cross sectional form, having a flange portion 27a overlying the edge of the pipe 26a, the coupling having an enlarged body 27b adapted to be flexed and placed under compression in inserting the pipe 26a into the pipe 26, the enlarged portion carrying a plurality of spaced metallic members 27c adapted to engage the walls of the pipes 26 and 26a to complete the electrical ground therebetween.

In Fig. 10 of the drawings, I have shown a coupling body 28 fashioned from a sheet of metal or any other desired material to form at opposite sides thereof, oppositely disposed inner and outer longitudinally projecting tooth-like members 28a, 28b, and 28d, both sides of which are inclined at the center of the coupling 28, the tooth-like projections forming corresponding recesses on the inner and outer faces of the coupling in which are placed rubber or other elastic or yieldable rings 28c which project slightly beyond the edges of the teeth 28a, 28b, and 28d. These rings are adapted to be placed under compression to firmly engage the walls of the tubes or pipes to be coupled together, and at the same time, the walls of said tubes or pipes are adapted to engage the tooth-like projections of the coupling body, the latter being capable of yielding under tension or pressure to a slight degree in the direction of the central portion of the coupling, as will be apparent. In this construction, the metallic body 28a completes the grounding of the pipes or tubes coupled together.

In Fig. 11 of the drawings, I have shown a coupling body 29 which is fashioned from a tubular body of suitable material to provide a corrugated wall structure having alternately arranged inwardly and outwardly projecting ribs 29a and 29b, capable of flexing in the direction of the coupling movement of the tubes or bodies in the manner of the members 22a as in Fig. 1 of the drawing to firmly and securely couple the tubes or pipes together. If the coupling 29 be composed of metal, the electrical ground will be completed through said coupling, but my invention is not necessarily limited to a metallic coupling, as the device 29 may be composed of non-metallic material if desired.

In Figs. 12 and 13 of the drawings, I have shown a coupling body 30 consisting of a tube of metal or other suitable material having longitudinally and circumferentially spaced knob or bead-like members 30a on the inner wall and 30b on the outer wall thereof. These members are adapted to engage the walls of tubes or pipes 31 and 31a in coupling the same together. Mounted on the ends of the coupling 30 are U-shaped coupling and gasket members 30c composed of rubber or other yielding material which are adapted to be placed under compression in the operation of coupling the pipes or tubes 31 and 31a and also serve to provide a water and air-tight connection between the same. It will also be understood that the bead-like members 30a and 30b may be placed under compression in the operation of coupling the pipes together, and if the coupling device 30 be composed of metal, the electrical ground will be completed.

In Figs. 14, 15 and 15a, I have shown another modification wherein a plurality of rings 32 of rubber or other yieldable material, diamond-shaped in cross sectional form, are coupled together to form a coupling body by the use of a plurality of metallic coupling members 33, one of which is shown in detail in Fig. 15a of the drawings, said members being alternately arranged so as to overlap adjacent rings 32, and each of said members consisting of two inwardly projecting V-shaped walls 33a, one outwardly projecting V-shaped wall 33b and two straight end walls 33c, the latter being in alinement with the peak of the V-shaped wall 33b. The exposed edges or walls of the coupling 33 are adapted to extend slightly beyond the inner and outer edges 32a and 32b of the rings 32, whereby in coupling two pipes or tubes together with the coupling shown in said figures, the protruding edges of the members 33 may be flexed by virtue of the resilient texture of the rings 32 into inclined positions, and placed under compression and firm engagement with the tubes, and will also operate to complete the electrical ground.

In Figs. 16 and 17, I have shown another form of coupling comprising a metallic sleeve 34 in the ends of which are disposed bands 34a and 34b to which are vulcanized or otherwise secured a plurality of circumferentially spaced and preferably corrugated metallic strips 35, which bridge the distance between the bands 34a and 34b and which are also preferably of greater thickness centrally thereof, the walls tapering to the opposite ends of said strips as clearly seen in Fig. 16. In this form of construction, the pipes or tubes 36 and 36a indicated in dotted lines in Fig. 16 are passed through the rings 34a and 34b, placing the same under compression and are moved onto the beveled surfaces of the strips 35 and into firm engagement therewith, the rings in addition to the strip 35 serving to firmly couple the pipes or tubes together, the strips 35 completing the electrical ground between the pipes, and the rings 34a and 34b providing an air and liquid seal for the coupling.

In Fig. 18 of the drawings, I have shown a coupling body 37 substantially similar to the body 25 shown in Fig. 6 of the drawings, having inwardly and outwardly projecting ribs or tooth-like members 37a and 37b. In this construction, I mount in the body 37 in longitudinally spaced rows, a plurality of circumferentially spaced and radially arranged wire or pin-like strands 38 which project beyond the inner and outer faces of the body 37 and preferably arranged in alinement with the projections 37a and 37b forming brush-like insertions for engagement with the walls of the tubes or pipes to be coupled together thereby.

In Fig. 19 of the drawings, I have shown a modification of the structure shown in Fig. 11 whereby a body 39 of metal, fibre, paper or other suitable material is fashioned to form longitudinally spaced inner and outer V-shaped thread-like members 39a and 39b. This coupling as formed, may be used with or without other or resilient, more yieldable members, it being understood that the tooth-like projections will flex in the operation of coupling two pipes or tubes together.

In Fig. 20 of the drawings, I have shown another modification of the construction shown in Figs. 6 and 18, employing a coupling body 40, similar to that shown in said figures and preferably composed of yieldable material, in which body is embedded a plurality of curved metallic plates 41 which are exposed through the inner and outer faces of the walls of the coupling body 40 and are arranged adjacent the inwardly and outwardly projecting tooth-like members 40a and 40b. The members 41 are adapted to be placed under compression in coupling two tubes or pipes together and also forming the completion of the electrical ground.

My invention is primarily adapted for use as a coupling for electric conduits wherein it is essential to maintain the ground circuit through the adjacent ends of conduit tubes coupled together, but I am not necessarily limited to this or any other specific use of the invention. It will be understood that while I have shown and described a number of modified uses or methods of carrying my invention into effect, and have indicated different types of metallic, fibrous and resilient or yieldable bodies, together with different types of metallic elements constituting parts of resilient or yieldable bodies, that my invention is not necessarily limited to the specific combination or assemblage of structures herein shown and described, nor to the structural details herein set out, and various changes therein and modifications thereof may be made within the scope of the appended claims without departing from the spirit of my invention or sacrificing its advantages.

Having fully described my invention, what I claim as new and desire to secure by Letters Patent, is:—

1. A device for coupling the adjacent ends of electric conduit tubes and for completing the electric ground through said tubes comprising a metallic coupling sleeve, a coupling body of elastic material interposed between said tubes and said sleeve and involving metallic elements engaging the walls of said tubes and sleeve to complete the electric ground circuit therethrough, and said metallic elements being placed under compression in coupling the tubes together within said sleeve and coupling body to secure said tubes against displacement and to provide a sure ground connection.

2. A coupling of the class described comprising a tubular body of rubber and metallic elements constituting a part of said body and exposed through the surfaces thereof.

3. A tube coupling of the class described for coupling adjacent ends of two tubes including a coupling sleeve encircling the adjacent ends of the tubes to be coupled, said coupling comprising a body interposed between asid sleeve and the ends of said tubes, and said coupling body including metallic members engaging said tubes and sleeve and adapted to flex and be placed under compression in the operation of coupling said tubes therewith.

4. A tube coupling of the class described for coupling adjacent ends of two tubes including a coupling sleeve encircling the adjacent ends of the tubes to be coupled, said coupling comprising a body interposed between said sleeve and the ends of said tubes, said coupling body including metallic members engaging said tubes and sleeve and adapted to flex and be placed under compression in the operation of coupling said tubes therewith, and said coupling body including elastic material cooperating with said metallic members which are embedded therein.

5. A tube coupling of the class described for coupling adjacent ends of two tubes including a coupling sleeve encircling the adjacent ends of the tubes to be coupled, said coupling comprising a body interposed between said sleeve and the ends of said tubes, said coupling body including metallic members engaging said tubes and sleeve and adapted to flex and be placed under compression in the operation of coupling said tubes therewith, said coupling body including elastic material cooperating with said metallic members which are embedded therein, and said metallic members firmly engaging the walls of the tubes and sleeve to complete an electric ground circuit therethrough.

6. A coupling of the class described comprising the combination with a body of elastic and non-metallic material, of metallic members exposed through the surface of said body.

7. A coupling of the class described comprising the combination with a tubular body composed of elastic non-metallic material, of metallic members constituting part of said body and exposed through the inner wall surfaces thereof.

8. A coupling of the class described comprising the combination with a tubular body composed of elastic non-metallic material, of metallic members constituting part of said body and exposed through the inner wall surfaces thereof, said members being spaced longitudinally of said body.

9. A coupling of the class described comprising the combination with a tubular body composed of elastic non-metallic material, of metallic members constituting part of said body and exposed through the inner wall surfaces thereof, said members being spaced longitudinally and circumferentially of said body.

10. A tubular coupling of the class described comprising a body of elastic material having members disposed on the inner and outer surfaces of said body and adapted to be flexed and placed under compression in the movement of the parts to be coupled thereby longitudinally of said body.

In testimony that I claim the foregoing as my invention I have signed my name this 20th day of Oct., 1927.

HARRY E. SIPE.